(12) United States Patent
Grenlund

(10) Patent No.: US 6,649,905 B2
(45) Date of Patent: Nov. 18, 2003

(54) ACCELEROMETER AND DEVICES USING THE SAME

(76) Inventor: Aaron E. Grenlund, 101 Rainier St., Puyallup, WA (US) 98372

( * ) Notice: Subject to any disclaimer, the term of this patent is extended or adjusted under 35 U.S.C. 154(b) by 243 days.

(21) Appl. No.: 09/817,404

(22) Filed: Mar. 26, 2001

(65) Prior Publication Data

US 2002/0134925 A1 Sep. 26, 2002

(51) Int. Cl.[7] .................................................. G01J 1/24
(52) U.S. Cl. ................................................. 250/227.14
(58) Field of Search ....................... 250/227.14, 231 R, 250/216, 227; 73/493; 473/233

(56) References Cited

U.S. PATENT DOCUMENTS 3,717,857 A * 2/1973 Evans ................... 340/870.13
4,239,963 A * 12/1980 August et al. ........... 73/514.26
2002/0134153 A1 * 9/2002 Grenlund ..................... 73/493

* cited by examiner

Primary Examiner—Tu T. Nguyen
(74) Attorney, Agent, or Firm—Keith D. Gehr

(57) ABSTRACT

An accelerometer useful over a very wide range of gravitational forces is described. The device is based on the use of an optical fiber having a free cantilevered end subject to movement due to inertial lag. A constant output light source is located at one end of the optical fiber and a multicell photoarray is placed adjacent the free end of the fiber so that movement of the fiber due to acceleration can be readily detected. The individual cells in the array are preferably masked so that the output is a function of the lateral displacement of the fiber. This gives a linear or other voltage output curve related to the magnitude and direction of fiber movement. A multiplexing circuit repetitively samples the output of each photocell in the array. The output is preferably digitized and can provide a direct input into a computer that will convert data on acceleration to associated position, velocity and force involved.

20 Claims, 7 Drawing Sheets

OPTICAL FIBER POSITION
VS
RELATIVE MOTION OF
SENSED OBJECT

NEUTRAL (NO LATERAL MOTION)
OPTICAL FIBER POSITION
VS
ROTATIONAL POSITION OF SENSED OBJECT

OPTICAL FIBER POSITION DURING ROTATIONAL AND
LATERAL MOVEMENT OF SENSED OBJECT

MASKING PATTERN FOR
FOUR OPTICAL FIBERS

ACCELEROMETER AND DEVICES USING THE SAME

The present invention is directed to an accelerometer, especially one capable of measurement of very high acceleration and deceleration rates. The accelerometer is particularly useful for measurement of extreme forces such as those caused by impacts of moving bodies contacting another moving or a stationary body.

BACKGROUND OF THE INVENTION

Accelerometers are devices widely used for applications as diverse as vibration monitoring, appliance control, joysticks, industrial process control, space launches, satellite control, and many others. A use suggested by one manufacturer, without further elaboration, is for sports diagnostic devices and systems. Many different types are available but all depend on measuring the inertial lag of some element during a positive or negative velocity change in a moving article. In one common type the element subject to inertial displacement may act as one plate of a capacitor or may be a moving plate between two fixed plates of a capacitor. The amount of inertial displacement of the sensitive element is extremely minute but this can be accurately measured by state-of-the-art circuitry and calibrated to indicate gravitational force measurements. Different types are available to measure from relatively low to relatively high g forces. Often these devices will be in the form of very small integrated circuits. These are available from a number of manufacturers. Without intending to endorse any specific product or supplier, exemplary accelerometers might be Types ADXL 150/ADXL 250 available from Analog Devices, Norwood, Mass. or Types MMA1201P or MMA 2200W available from Motorola, Inc., Denver Colo. These are capacitor types that will measure forces up to about 50 g maximum. One problem has been the lack of availability of accelerometers to measure very high forces; e.g., in the range of 100 g and above. The present invention ably serves that need.

SUMMARY OF THE INVENTION

The present invention is directed to an accelerometer and to some specific applications of the accelerometer. The accelerometer is suitable for general use but is particularly well adapted for measurement of extreme acceleration and deceleration rates that may be in excess of 100 times normal gravitational force. While there is no limit implied in the possible applications of the instrument, specific examples will be given later in which the accelerometer is used in combination with a baseball bat to assist coaching of a hitter.

The accelerometer of the invention is based on the principle of inertial lag of a cantilevered optical fiber or fibers when the article to which the device is coupled is set into motion. This inertial lag, and the corresponding direction of motion of the article, are sensed by an array of photosensors receiving light transmitted from the fiber or fibers.

For purposes of ease of description it will be assumed that a single optical fiber is used. However, this should not be regarded as a limitation. A specific example will be given later showing how multiple fibers might be employed.

The invention requires a constant output light source to the optical fiber. This source may conveniently be a light emitting diode close coupled to the fiber. Appropriate circuitry well known to those skilled in the art assures constant current flow to and light output from the diode. Other light sources giving a constant output can be equally suitable. The optical fiber may be of any material commonly used for this purpose. While a clad plastic fiber is preferred, this is not essential. Glass fibers, clad or unclad, are also suitable. One end of the optical fiber is adjacent the light source and generally fixed in position. A fixed anchor point holds the fiber near the opposite end. However, a short cantilevered and unsupported portion of the fiber extends beyond the anchor point. It is this portion that is sensitive to inertial lag during movement. The cantilevered portion is preferably weighted to increase the mass subject to the inertial force.

Light emitted by the optical fiber (or transmitter) is detected by a photoreceptor array. This will have a plurality of photosensors that will output information both as to magnitude and direction of the transmitter deflection. The individual photosensors are preferably masked in a novel manner to effect a desired current output vs deflection relationship. The masking can be readily adapted to product a linear output curve or a curve of any other advantageous type; e.g., logarithmic.

The individual photosensors of the photoreceptor array are arranged about a central or neutral point. The relationship of the cantilevered section of the optical fiber transmitter and photoreceptor array may be adjusted so that the fiber is aimed directly at the neutral point; e.g., when the accelerometer is suspended with the transmitter oriented downward.

The individual photosensors are preferably coupled to a multiplexing circuit that will sequentially and repeatedly sample the output of the photoreceptor array. The sequencing is controlled by a precision timer. An output circuit conditions the signal from the multiplexing circuit. Here the multiplexer output is preferably changed from an analog to a digital signal. This conversion can result in a significantly improved signal to noise ratio as well as providing a direct computer input.

A receiver then processes the signal from the output circuitry. This contains circuitry and software to record or display acceleration, force, and position data sensed by the accelerometer. A timing circuit in the receiver is controlled by a phase lock loop to be in synchronization with the timing circuit of the accelerometer. The receiver and output circuitry may be hard wired to each other. Alternatively, the data from the output circuitry may be coupled to a transmitter that sends it to a remote receiver.

It is thus an object of the invention to provide an accelerometer that is simple in construction and well adapted to measure an extreme range of acceleration rates.

It is also an object to provide an accelerometer based on inertial deflection of a cantilevered optical fiber.

It is a further object to provide a masked photoreceptor array to determine magnitude and direction of deflection of the cantilevered portion of the optical fiber during movement of an object to which the accelerometer is associated and thus provide acceleration and direction of movement data.

It is yet an object to instrument an athletic implement with the accelerometer to provide real time data to assist in coaching an athlete.

These and many other objects will become readily apparent to those skilled in the art upon reading the following detailed description taken in conjunction with the drawings.

DETAILED DESCRIPTION OF THE PREFERRED EMBODIMENTS

Figure 1:
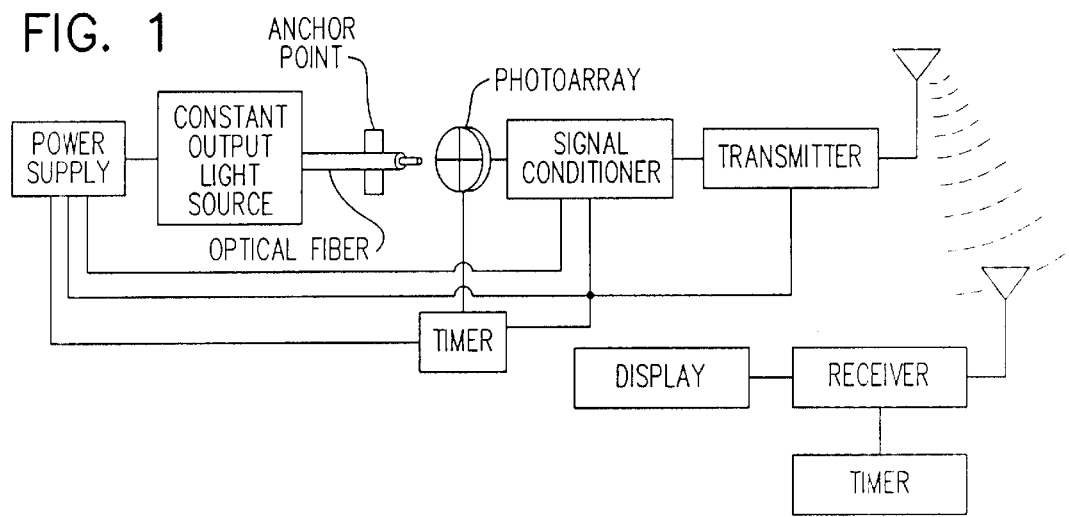
FIG. 1 is a block diagram of the accelerometer of the present invention.

Referring now to FIG. 1, a block diagram shows the important elements of the accelerometer. A conventional power supply provides an appropriate voltage and current to all of the electronic components of the accelerometer. The power supply provides a regulated constant current to a light source, which preferably is a light emitting diode (LED). If desired, additional diodes may be linked in series, one of which might serve as an on/off indicator. One LED that has been found very satisfactory is provided by Siemans, U.S. Optoelectronics Division, Cupertino Calif., as Part No. SFH450 or, alternatively, Part No. SFH450V. These diodes emit visible green light and are designed to be coupled directly to a standard 1000 $\mu$m diameter plastic optical fiber having cladding with a 2.2 mm outside diameter. As is common with optical fiber technology, both ends should be properly cut and polished. A suitable clad plastic fiber is available from AMP Inc. Valley Forge, Pa. Other light sources and light frequencies are equally suitable and may be chosen depending on the particular length and transmission properties of the optical fiber selected.

The opposite or transmitting end of the optical fiber is rigidly anchored with about 15–30 mm protruding and cantilevered beyond the anchor. Cladding may be stripped off from a part or all of the cantilevered portion. Preferably the free end is weighted to increase the mass subject to inertial force. Standard ferrite beads make excellent weights although the composition of the weight is not critical. Ferrite beads weighing 0.134 g, 0.25 g, and 0.92 g have been found to be useful. Smaller weights will provide a more sensitive response but larger beads will increase amplitude of the response. Similarly, smaller diameter optical fibers will be more sensitive than relatively larger ones. The free end of the cantilevered portion is aimed at the center, or neutral point, of a photoreceptor array. Spacing between the fiber and photoarray might vary between about 0.5–3 mm, most typically about 1–2 mm. While the number of photosensors in the array may vary, a four cell array is the one preferred due to its ready off-the-shelf availability. A photodiode array supplied by Siemens as Part No. KOM 2084 has proved very satisfactory. This has four individual square cells arranged within a square pattern with 0.2 mm spacing between the cells and has outside dimensions of 6 mm on each side. The photocells are connected into a signal conditioner which contains the multiplexing circuitry to sequentially sample their output, a timer controlling sampling rate, and output circuitry. As seen in FIG. 1, the output means sends a signal to a transmitter. This signal is picked up by a receiver having a recording or display unit. A timer at the receiver is synchronized with that of the signal conditioner by a phase lock loop. Alternatively, the connection between the signal conditioner and receiver may be hard wired.

Figure 2:
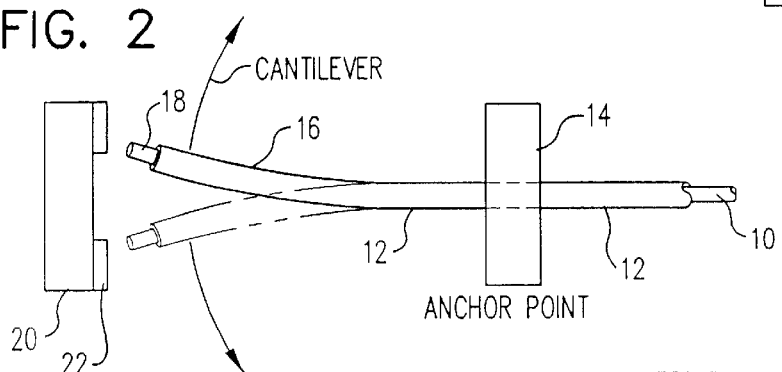
FIG. 2 illustrates physical relationship of the cantilevered portion of the optical fiber and photoreceptive array and shows how movement of the object being sensed affects fiber position.
Figure 3:
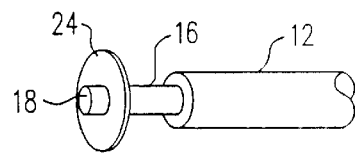
FIG. 3 is a detail showing a weighted end of the cantilevered end of the optical fiber.

FIGS. 2 and 3 illustrate more clearly the configuration of the cantilevered end of the optical fiber. The optical fiber 10 with cladding 12 is held rigidly at an anchor point 14. The clad fiber extends about 25 mm beyond the anchor point and has a free end 16 that is subject to movement from inertial forces. The transmitting end of fiber 10 is directed toward a photoreceptor array 20 having a mask 22. As seen in FIG. 3, the cladding may be stripped for a short distance and weight 24 may optionally be used near the end of the free portion 16 of the optical fiber to add inertial mass.

Figure 4A:
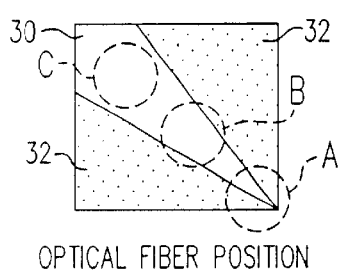
FIGS. 4A and 4B indicate how position of the light transmitting optical fiber affects output of an individual masked photosensor.
Figure 4B:
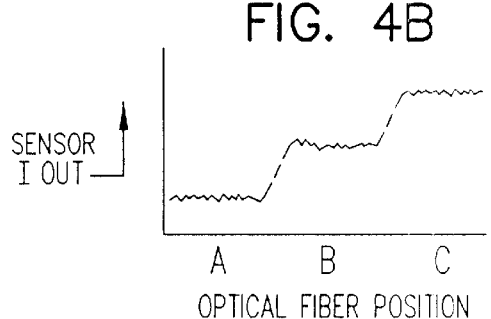

Referring now to FIGS. 4A and 4B, the function of the masks on the photosensors will be explained. A single square photosensor 30 is illustrated. This is partially covered with mask 32 having a V-shaped opening. Each sensor is similarly masked with the apices of the Vees pointing toward the central point of the array. The approximate neutral position of the optical fiber is shown at position A. The equivalent current output of photodiode 30 for this fiber position is seen at FIG. 4B. As acceleration force moves the optical fiber to position B, more of the photodiode area is uncovered. The current output of the photosensor then increases, as again seen in FIG. 4B. At the final position C, a higher acceleration force has now moved the optical fiber to a completely unmasked portion of the photosensor and the output current is maximized. It can be readily seen that without the masking there would be no discrimination between any position of the optical fiber after it had moved totally within the area of the photodiode. In general the angle exposed by the mask will vary between about 20°–60°. The optimum angle can be readily determined experimentally but about 30° is usually preferred with a 1000 $\mu$m diameter optical fiber. A greater angle will increase signal output but may reduce resolution somewhat. While the V-shaped masks shown here and are generally preferred, other mask configurations may be used to vary the shape of the output current curve. It may in some instances be useful to use a mask pattern that will give a logarithmic output.

Figure 5:
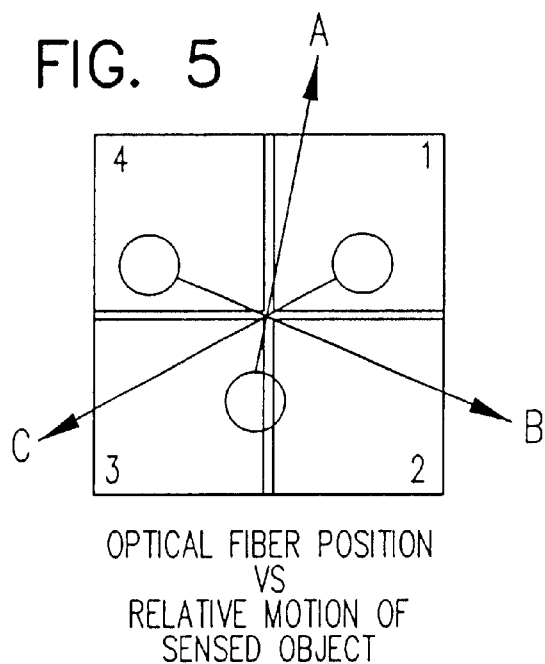
FIG. 5 shows how position of the optical fiber responds to varying directions of movement of the object being sensed.

FIG. 5 illustrates the full photo array, but with the masks deleted for clarity. In this case the accelerometer is attached to an object subject to movement. As the object accelerates in direction A the cantilevered end of the optical fiber will lag the motion and become positioned as shown over photodiodes 2 and 3, with a somewhat higher output from photodiode 3. If the motion had been in direction B the optical fiber would have been totally over photodiode 4. Similarly, had the motion been in direction C, the end of the optical fiber would have been positioned entirely over photodiode 1. Remembering that the photosensor output is rapidly sampled from each sensor by the multiplexing circuit, it can readily be seen that both direction of movement and amplitude of acceleration can be measured.

It should be noted that position of the moving article is shown along a time axis acceleration data, or this data transformed into velocity or force, is shown along a signal amplitude axis. Rise time is a function of acceleration rate.

Figure 6:
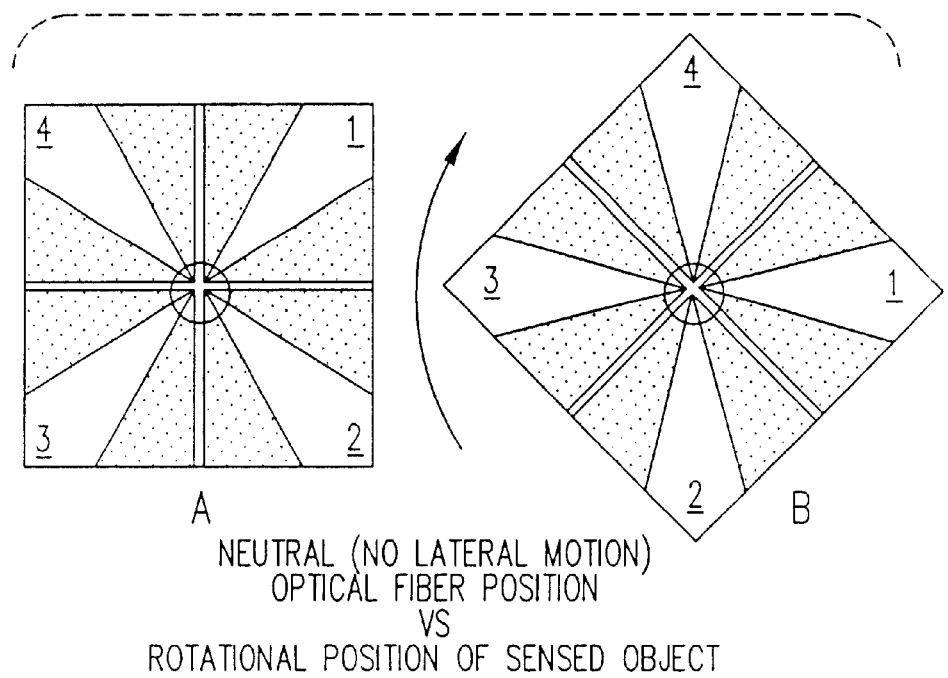
FIGS. 6A, 6B, and 7 show how the optical fiber position responds to rotational and/or lateral movement of an object being sensed.
Figure 7:
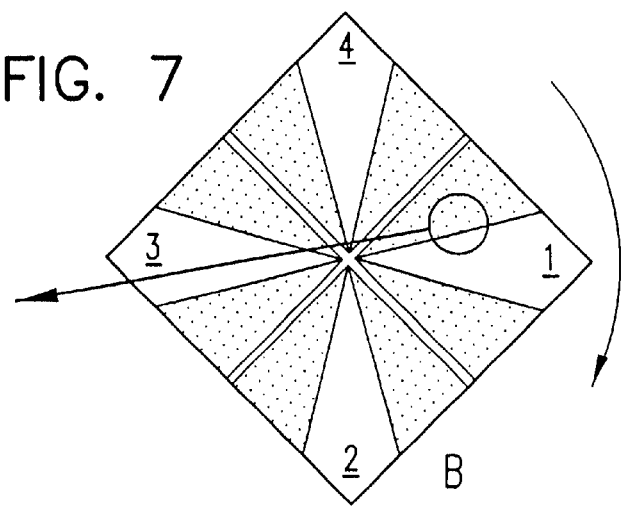

Both lateral position and rotational position can be indicated, as is shown in FIGS. 6 and 7. In both of these figures the four photosensor array is shown with masking in place. FIG. 6A shows the relative positions of the optical fiber and four sensor photoreceptor array in a neutral position. Note that the optical fiber is somewhat below the center point of the array. The relative position of the array and fiber is typically adjusted with the accelerometer suspended so that the optical fiber end is freely hanging plumb in a downward direction. When the accelerometer is brought back to a horizontal position there will be a slight droop of the fiber below the center location corresponding to 1 g of force. This will be sensed by the slightly greater output from photosensors 2 and 3 compared with cells 1 and 4. Now, if the article holding the accelerometer is rotated 45° clockwise, as seen in FIG. 6B, the output will be greatest from sensor 2 even though the article is still held horizontally. FIG. 7 shows the case in which the article is both rotated and accelerated laterally. The optical fiber will move to the indicated position over sensor 1 and both the amount of rotation and lateral motion will be sensed.

Initial calibration of the accelerometer can be made by comparing it with the output of a temporarily or permanently installed conventional accelerometer. Or, as noted earlier, the cantilevered section of the optical fiber transmitter may be adjusted with respect to the photoreceptor array so that it is aimed directly at the neutral point when the accelerometer is suspended with the transmitter oriented downward in a plumb position. Movement to a horizontal position will produce an output equivalent to a 1 g force.

Figure 8:
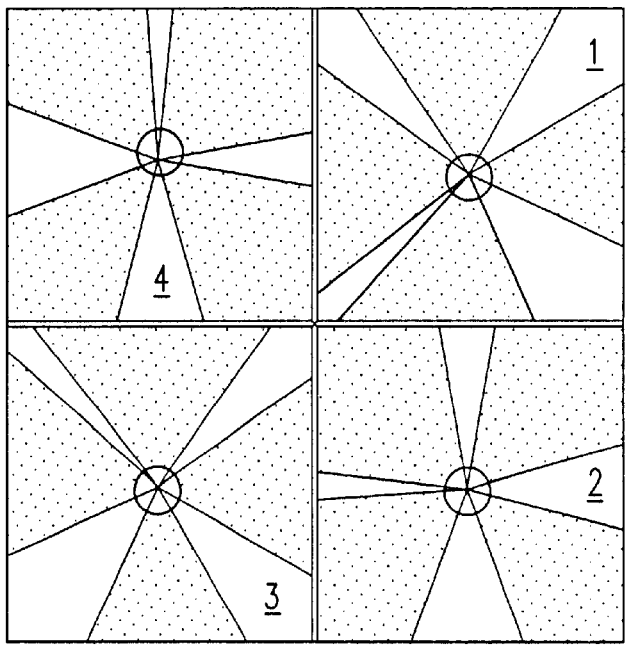
FIG. 8 shows a suitable masking pattern for use when multiple optical fibers are used.

As was noted earlier, there might be circumstances where more than one optical fiber could be advantageous; e.g., to increase signal to noise ratio. Multiple fibers will also give greater resolution of rotation. This can be done while still using a single four photosensor photoreceptor array as shown in FIG. 8. Here each sensor is masked to have four V-patterns with the apices of the Vees now located in the center of the cell. Instead of uniform angles in the masking, adjacent V-patterns placed over a single photoreceptor differ in angle. While the same pattern is maintained over each of the cells, it is rotated somewhat in each adjacent cell. For purposes of illustration the increase in pattern angle shown FIG. 8 is 10°; i.e., from 10° to 40° (the individual photosensors are numbered in the 30° angle portion), and the pattern rotation from cell to cell is 45°. These parameters are not considered critical, however. They may be readily determined and optimized by simple experimentation to produce optimum sensitivity and resolution for the particular intended use. Alternatively, a multiple photosensor matrix may be used rather than a single one. By illuminating pixels in this array further from the center point or zero position, this sensor cab resolve two directions of motion simultaneously. This enables the same type of information to be gained as was possible with the single fiber and a four cell array. While the use of multiple fibers is advantageous in some circumstances, it does raise the level of complexity in construction and circuitry. In general, a single fiber is the preferred construction.

Figure 9:
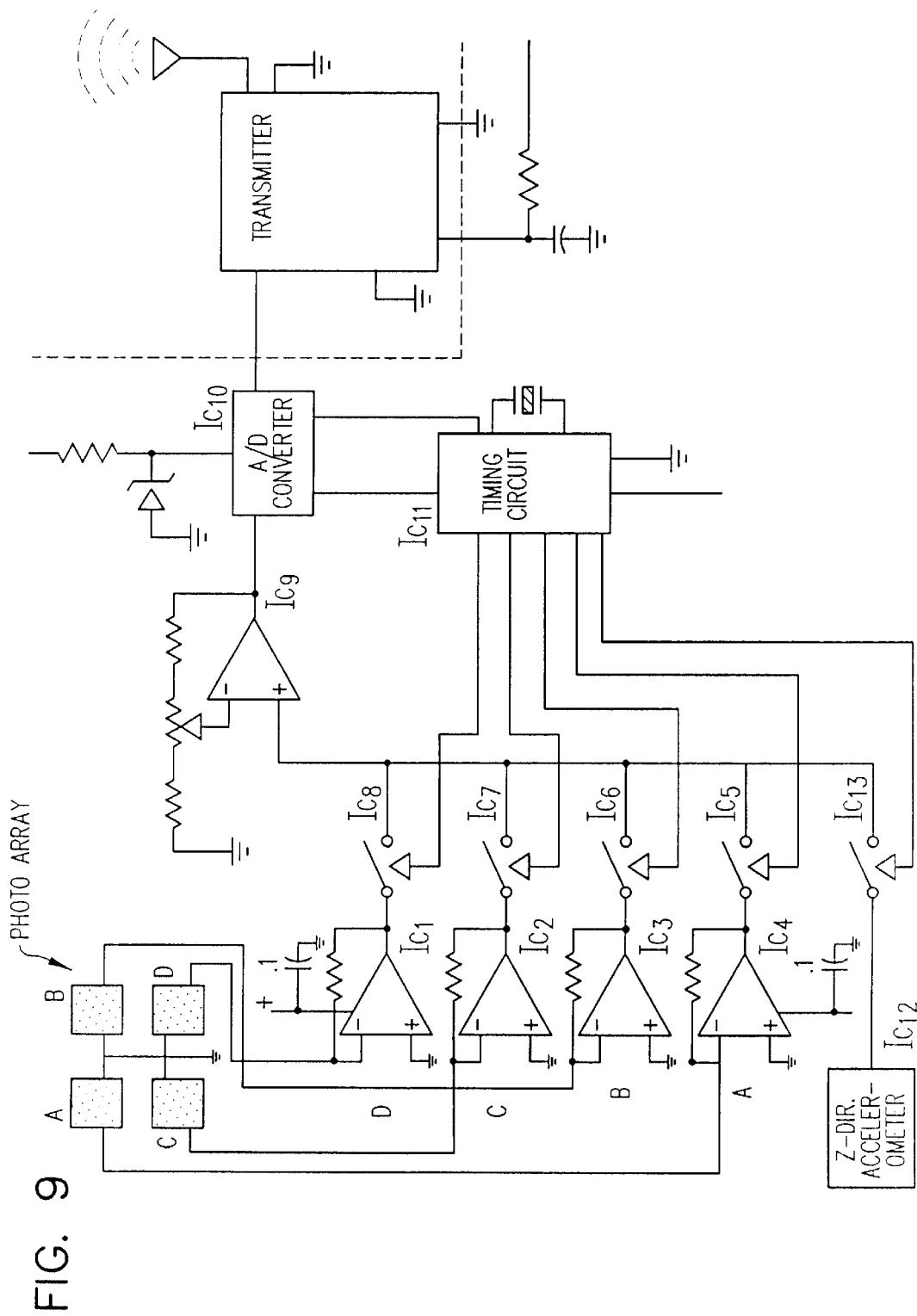
FIG. 9 shows a circuit arrangement by which the signals received by the photoarray are processed.

Circuitry of the signal conditioner will now be explained by reference to FIG. 9. The four photosensors A–D are each connected to individual integrated circuits ($IC_1$–$IC_4$) that convert the current output of the sensors to a voltage output. The output of each integrated circuit is sequentially sampled by electronic switches ($IC_5$–$IC_8$). Output is scaled by $IC_9$ and fed to $IC_{10}$ which is an analog to digital converter. A crystal controlled timing circuit $IC_{11}$ controls the signal sampling sequence. The now digitized signal is input to a transmitter or, alternatively, it may be hard wired to a receiving circuit that will process the signals with integrally contained software.

Assuming, for example that Cartesian coordinates are the units of measurement, the accelerometer just described will measure acceleration in the x-y direction and rotation. Where information on z-direction movement is required an additional more conventional accelerometer may be added. This optional arrangement is shown in FIG. 9 as $Ic_{12}$ and its output is sampled through timed switch $Ic_{13}$. An application where this additional conventional accelerometer is used in combination is shown in the example that will shortly follow.

Figure 10:
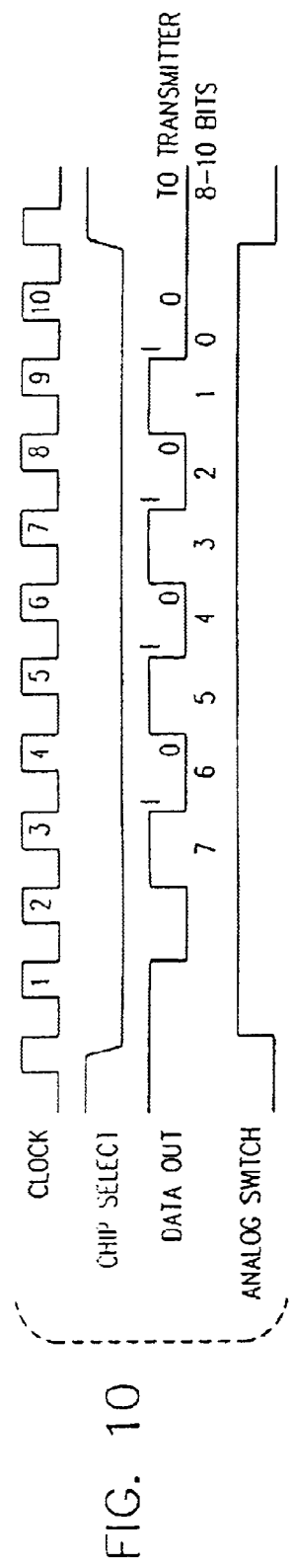
FIG. 10 is a detail of the gating and timing arrangement for processing signals from the photoarray.

FIG. 10 shows a single sampling sequence. An analog switch closes for a period of time sufficient to allow signal transmission from a single photoreceptor. One of the chip select switches ($IC_5$–$IC_8$) now closes. The current from this photosensor is processed as described above and becomes an 8–10 bit signal to the transmitter prior to opening of each individual switches.

Figure 11:
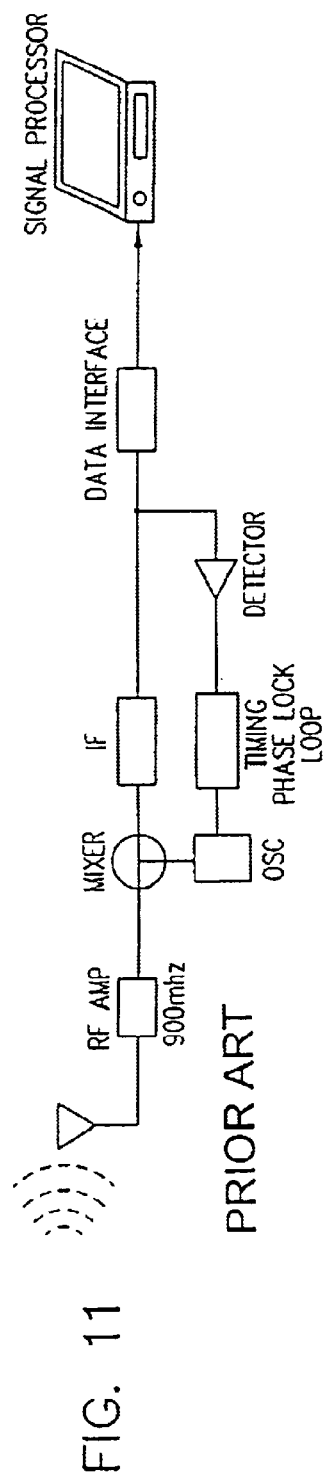
FIG. 11 shows a block diagram of a receiver and signal processor.

FIG. 11 illustrates one form of receiver that has been very satisfactory. This is a conventional superheterodyne system using an initial radio frequency amplifier. The signal from this amplifier goes to a mixer that also receives a signal from a local oscillator to create an intermediate frequency (IF) signal. The IF signal is split with one leg going to a detector and a timing circuit (phase lock loop) which, in turn acts as feedback to control frequency of the oscillator. The detector serves as a filter to isolate the phase lock loop timing pulse. Timing is synchronized from the data transmission rate. The other leg of the IF signal goes to a data interface unit that converts serial data to parallel processing. A signal processor, typically a personal computer, interprets and displays the resulting data. The methods of calculation describing interpretation of data will be described later.

Figure 12:
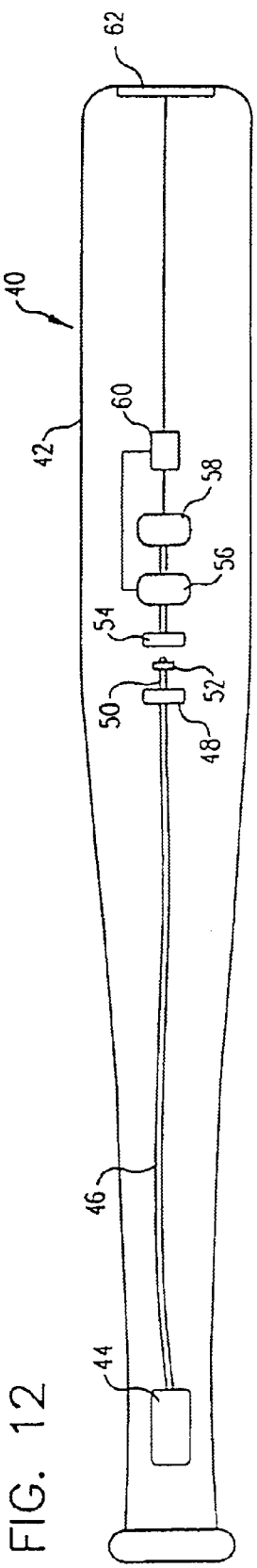
FIG. 12 is illustrative of a baseball bat instrumented with the present accelerometer.

FIG. 12 is illustrative of one of the many applications of the accelerometer. Athletic coaches now depend on visual observation and may use slow motion video to detect faults in an athlete's performance. Baseball may be taken as an example. A fast pitch will take only about 400 msec to travel from the pitcher to the batter. The batter must use about half of this time to make the decision whether or not to swing at the ball. If the decision made is yes, he must judge ball speed to control the timing of his swing and must decide where he expects the ball to be in physical space as it approaches the hitting zone. This 200 msec window for a fast ball is incredibly short. In addition, the bat position (or swing radius) must be controlled so that the "sweet spot" will be in the impact zone. The sweet spot is a short portion along the barrel of the bat where maximum energy is transmitted to the ball. Hitting outside this zone will reduce distance and also transmits substantial vibration to the batter's hands.

Training for elite athletes has now reached highly sophisticated levels (for examples in the popular press see *Smithsonian* magazine, May 1999 and *National Geographic*, September 2000). The subject has not escaped the interest of the academic world and even been explored in the realm of theoretical physics. An article by Alan Nathan in *American Journal of Physics* 68(11): 979–990 (2000) deals in deep mathematical detail with the vibrational and impact dynamics of the collision of a baseball with a bat. However, Nathan's work was not supported by any empirical experimentation. A 1982 M.S. Thesis from Washington State University by Esther L, Moe, titled "A comparison of batting using bent handle and straight handle bats" looked further at the theoretical aspects of the sport.

The present accelerometer, used internally in a baseball bat, can supply information simply unavailable with visual coaching. It can detect the instant in time when the hitter begins his swing and give position of the bat in three dimensions at any instant during the swing. If there is contact with the ball, information is available as to the precise instant and position at which this contact was made. Further, it indicates whether the ball was hit squarely inside or outside the "sweet spot" area of the bat or whether the ball was contacted above or below the longitudinal axis.

The forces involved in hitting a baseball are enormous. Estimates place them as high as 100 g. Not only must the instrument be able to measure them accurately in the first place but it must also be able to survive these extreme forces. Further, the instrument must be sufficiently miniaturized to be able to fit within a bore hole in the bat without fatally diminishing its strength. Preexisting accelerometers known to the present inventor fail on all scores. Solid state accelerometers have poor signal to noise ratios and a relatively low dynamic range. Further, they have a long recovery time after a large impact.

The accelerometer described earlier has been successfully installed within a baseball bat and has produced information never before available. FIG. 12 shows how such a bat was constructed. The instrumented bat 40 is based on a conventional wooden baseball bat 42 having a longitudinal bore hole. Within the bore hole is placed a power supply and light emitter 44. This is coupled to an optical fiber 46 that passes through an anchor point 48 firmly mounted within the bat. A cantilevered end 50 of the fiber has mounted thereon a weight 52 to increase its inertial mass. The transmitting end of the optical fiber is directed to a photoreceptor array 54. This is connected to signal processing circuitry 56 and a transmitter 58. A conventional accelerometer 60 also feeds its signal to the processing circuitry to measure redirection centripetal acceleration and enable calculation of torque. This is necessary since the radius of a swing changes continually from the shoulder position to the impact zone. A Type ADXL 190 available from Analog Devices is satisfactory for the redirection information. An antenna 62 transmits the signal to a receiver located some distance away. It should be noted that the arrangement just described is idealized and that the electronic components need not be mounted in the exact positions shown. An alternative arrangement could have the output of the signal processing circuitry directly wired through a light flexible cord emerging from the handle portion of the bat to the receiver.

Figure 13:
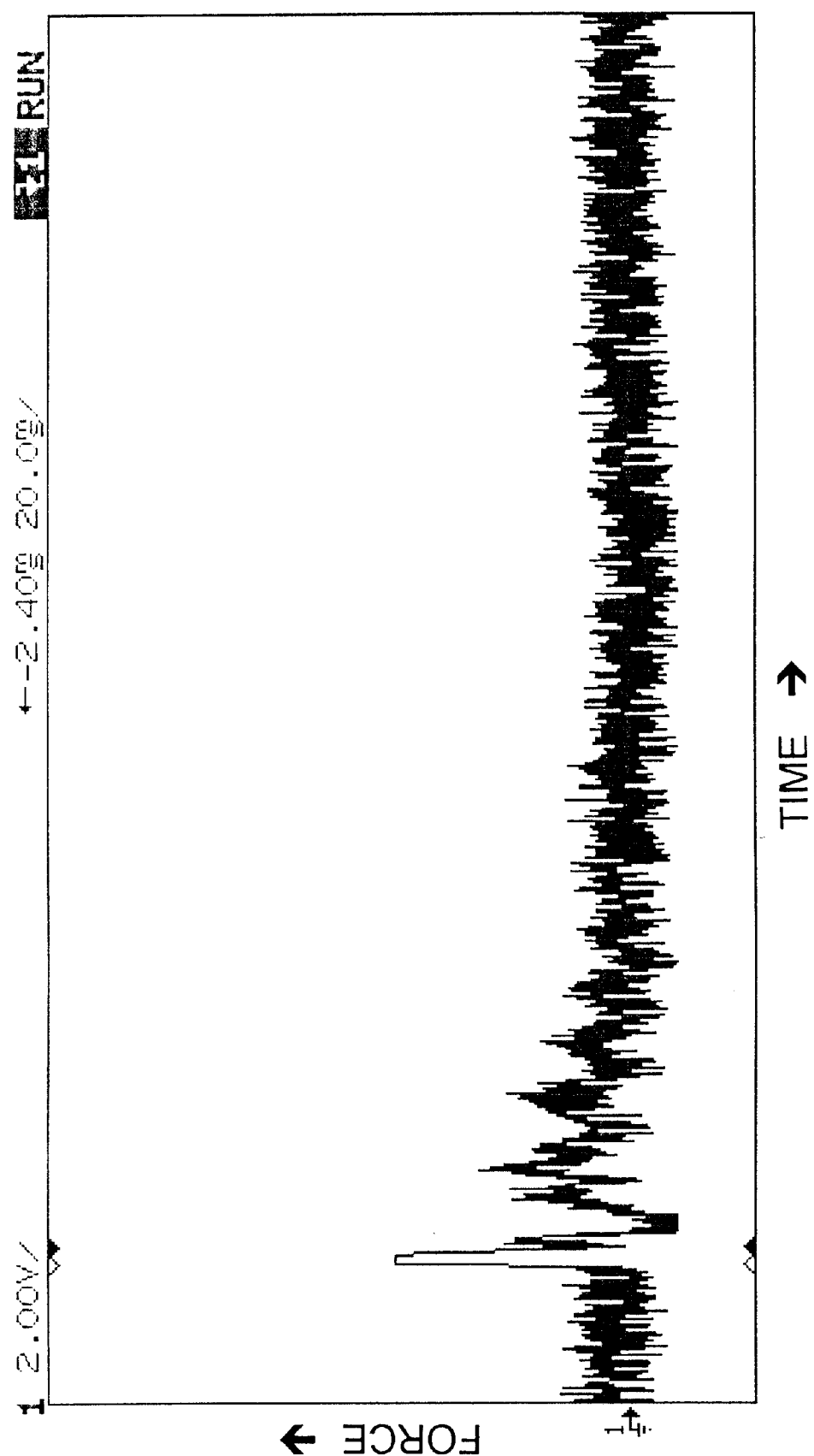
FIG. 13 is a real time output signal of force vs time as a batter swings an instrumented bat and hits a baseball.
Figure 14:
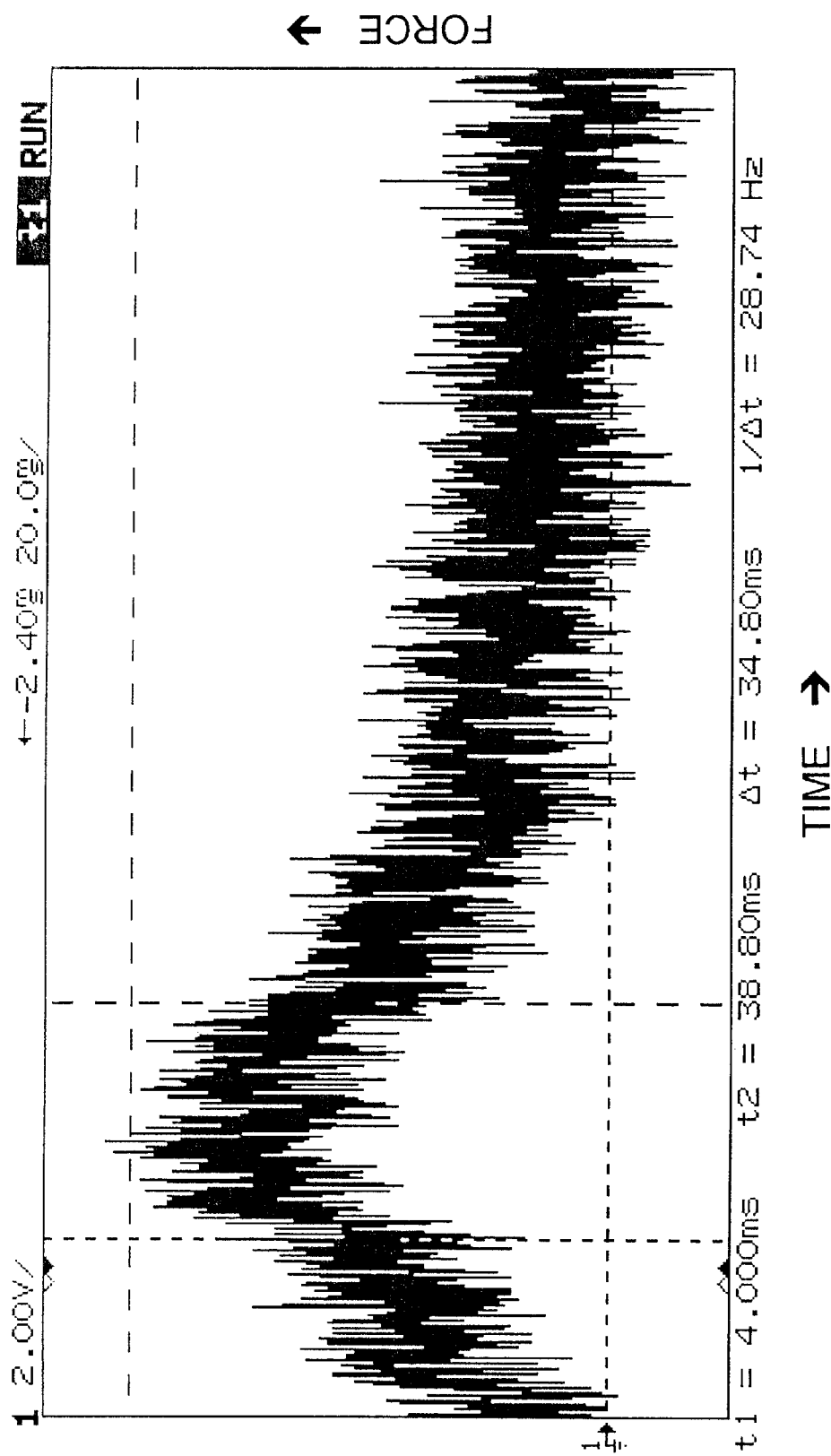
FIG. 14 is a similar plot of real time force vs. time, modified by a fast Fourier transform function treatment, as a batter swings at (and misses) a pitched baseball.

FIGS. 13 and 14 are actual output traces made of a bat swing, using the above described instrumentation. The graph on FIG. 13 is a trace of Force vs Time and indicates impact with the ball at the point noted by the large upward spike. This corresponds closely with the predicted results shown in FIG. 4 of the Nathan paper. FIG. 14 is a Force vs Time trace of a swing in which no ball contact was made. The data here have been modified by from the time domain to the frequency domain by treating it with a fast Fourier transfer function to simplify the harmonic complexity of the signal. The smooth rise and fall in the curve indicates the point at which maximum energy would have been delivered to the ball. This actual measurement generally corresponds to the data shown in FIG. 15 of the Nathan paper.

It must be appreciated that movement of a bat, tennis racquet, or golf club, to use three examples, is spatially very complex. To specifically consider a batter swinging a baseball bat, when viewed from above the swing would appear to be in a single plane. However, this is clearly not the case when viewed from in front of the player. The bat moves from behind the shoulder, dips below a neutral plane mid swing, and again crosses that plane as it moves upward during a follow through. Considering movement in spherical space, the bat will usually travel through two of the four quadrants above the neutral plane and two below. An additional complication to account for is the radially outward movement of the bat as the swing progresses.

Using spherical coordinates $\theta$, $r$, and $\phi$ for the data simplifies calculations. The force caused by the motion of the bat is centripetal acceleration and rotational acceleration. This force is acting orthogonal and opposite to the direction of travel of the bat. The bat travel is forward and the force on the accelerometers is 180° opposite. There is a radial component to the force which is centripetal acceleration, i.e., acceleration in the r direction (in the three dimensional space of spherical coordinates). The speed or velocity is the integral of the acceleration and the position is the integral of the velocity; i.e., motion in the $\theta$ direction. Measurement of the $\phi$ direction movement enables calculation of the change in elevation of the bat and enables calculation of rotational velocity. All results taken together describe the change in position of the bat with respect to time and enable calculation of velocities and forces involved.

It will be evident to those skilled in the art that many variations can be made in the construction and application of the accelerometer of the present invention that have not specifically been described herein. It is the intention of the inventor that these variations should be included within the spirit of the invention if encompassed within the following claims.

I claim:

1. An accelerometer which comprises:
   a constant output light source;
   an optical fiber light transmitter, said optical fiber having a fixed end adjacent the light source and a cantilevered motion and position responsive free end;
   a photoreceptor array having a plurality of photosensors located adjacent the free end of the optical fiber light transmitter, the individual photosensors in the array being arranged adjacent to each other around a central point, the free end of the cantilevered portion being aimed at the central point of the photoreceptor array, the photoreceptor array adapted to detect position and amplitude of any movement of the free end of the light transmitter relative to two axes of displacement.

2. The accelerometer of claim 1 in which the photoreceptor array comprises at least four photosensors.

3. The accelerometer of claim 1 in which the photoreceptor array comprises a multiple photosensor matrix.

4. The accelerometer of claim 1 further in combination with multiplexing means to sequentially sample output of each photosensor of the photoreceptor array; output means to condition the signal from the photosensors; and receiving means to process signals from the output means to show position and acceleration data from the accelerometer.

5. The accelerometer of claim 4 in which the multiplexing means includes a timing circuit coupled to the photoreceptor array to sequentially and repetitively read the output from each individual photosensor.

6. The accelerometer of claim 4 in which the output means converts an analog signal from the photoreceptor array to a digital signal.

7. The accelerometer of claim 6 in which the output means is coupled to a transmitter to transmit position and acceleration to a receiving means at a remote location, the receiving means including a timing circuit synchronized with the timing circuit of the accelerometer.

8. The accelerometer of claim 6 in which the output means is hard wired to the receiving means to transmit position and acceleration, the receiving means including a timing circuit synchronized with the timing circuit of the accelerometer.

9. The accelerometer of claim 1 in which the optical fiber light transmitter is a single optical fiber.

10. The accelerometer of claim 1 in which the optical fiber light transmitter comprises a plurality of optical fibers.

11. The accelerometer of claim 1 in which the individual photosensors in the photoreceptor are masked so that output of each photosensor is a function of the lateral position of the optical fiber relative to the photosensor.

12. The accelerometer of claim 11 in which the individual photosensors in the photosensor array have inner and outer portions, the inner portions being adjacent the central point, and the photosensors are masked so that light transmission to the inner portion is reduced relative to transmission to the outer portion.

13. The accelerometer of claim 12 in which the photosensors in the photoreceptor array are individually masked to provide a generally V-shaped open area with the apices of the V-shaped open areas directed toward the central point of the photoreceptor array.

14. The accelerometer of claim 1 in which of the optical fiber light transmitter is weighted adjacent the cantilevered free end or ends to increase the mass subject to inertial forces affecting the cantilevered end or ends.

15. The accelerometer of claim 1 in combination with an article subject to movement in which the position and acceleration of the article are to be measured during movement.

16. The accelerometer of claim 15 in which the article subject to movement is an athletic implement.

17. The accelerometer of claim 16 in which the article subject to movement is a baseball bat.

18. The accelerometer of claim 16 in which the article subject to movement is a tennis racquet.

19. The accelerometer of claim 16 in which the article subject to movement is a golf club.

20. A method of determining position and acceleration of a moving object which comprises:

providing a power supply associated with the object;

creating a constant output light source powered by the power supply;

transmitting the output of the light source through an optical fiber light transmitter, said optical fiber having a fixed end adjacent the light source and a cantilevered motion and position responsive free end;

determining light output and position of the optical fiber by a photoreceptor array having a plurality of photosensors, the individual photosensors in the array being arranged adjacent to each other around a central point, said array being located adjacent the free end of the optical fiber light transmitter, the photoreceptor array adapted to detect direction and amplitude of any movement of the free end of the light transmitter relative to two axes of displacement;

sequentially and repetitively sampling the output of each photosensor of the photoreceptor array;

conditioning the signal from the photosensors in an output means; and receiving and processing signals from the output means to show position and acceleration of the object as indicated by inertial displacement of the optical fiber relative to the photoreceptor array during movement of the object.

* * * * *